United States Patent [19]

Kozlik et al.

[11] Patent Number: 4,855,902
[45] Date of Patent: Aug. 8, 1989

[54] MICROPROCESSOR ASSISTED DATA BLOCK TRANSFER APPARATUS

[75] Inventors: Tony J. Kozlik, Phoenix; Ronald J. Freimark, Scottsdale, both of Ariz.

[73] Assignee: Honeywell, Inc., Minneapolis, Minn.

[21] Appl. No.: 198,814

[22] Filed: May 24, 1988

Related U.S. Application Data

[63] Continuation of Ser. No. 750,433, Jul. 1, 1985, abandoned.

[51] Int. Cl.[4] ............... G06F 13/10; G06F 13/40
[52] U.S. Cl. .................. 364/200; 364/240.2; 364/240.7; 364/254.3; 364/240.1; 364/260
[58] Field of Search ... 364/200 MS File, 900 MS File; 370/85

[56] References Cited

U.S. PATENT DOCUMENTS

| | | | |
|---|---|---|---|
| 4,237,534 | 12/1980 | Felix | 364/200 |
| 4,250,547 | 2/1981 | Matsumoto | 364/200 |
| 4,272,829 | 6/1981 | Schmidt et al. | 364/900 |

*Primary Examiner*—Eddie P. Chan
*Assistant Examiner*—Christina M. Eakman
*Attorney, Agent, or Firm*—A. A. Sapelli; D. J. Lenkszus; A. Medved

[57] ABSTRACT

An apparatus controls the movement of a data block between a peripheral and a data processing system, which comprises a bus which includes an address bus, a first data bus, and a second data bus, the peripheral being connected to the second data bus. A first memory, connected to the second data bus, stores data, and a second memory, connected to the first data bus, stores a plurality of dummy routines in predetermined areas, the predetermined areas of the second memory having corresponding buffer areas in the first memory. The first memory and the second memory correspond to a first memory area and a second memory area within a total predefined memory space, each memory location within the total memory space being defined by a unique memory space address. A processor connected to the first data bus, fetches an instruction, in response to a control signal from the peripheral, from a preselected one of the dummy routines. The address of the instruction is placed on the address bus specifying a corresponding location of the corresponding buffer area in the first memory. A switch element connected to the first data bus and the second data bus, disconnects the first data bus from the second data bus in response to an enable signal. Logic circuitry generates at least one control signal in response to the fetching of the instruction from one of the dummy routines, such that data is transmitted between the peripheral and the data processing system.

5 Claims, 6 Drawing Sheets

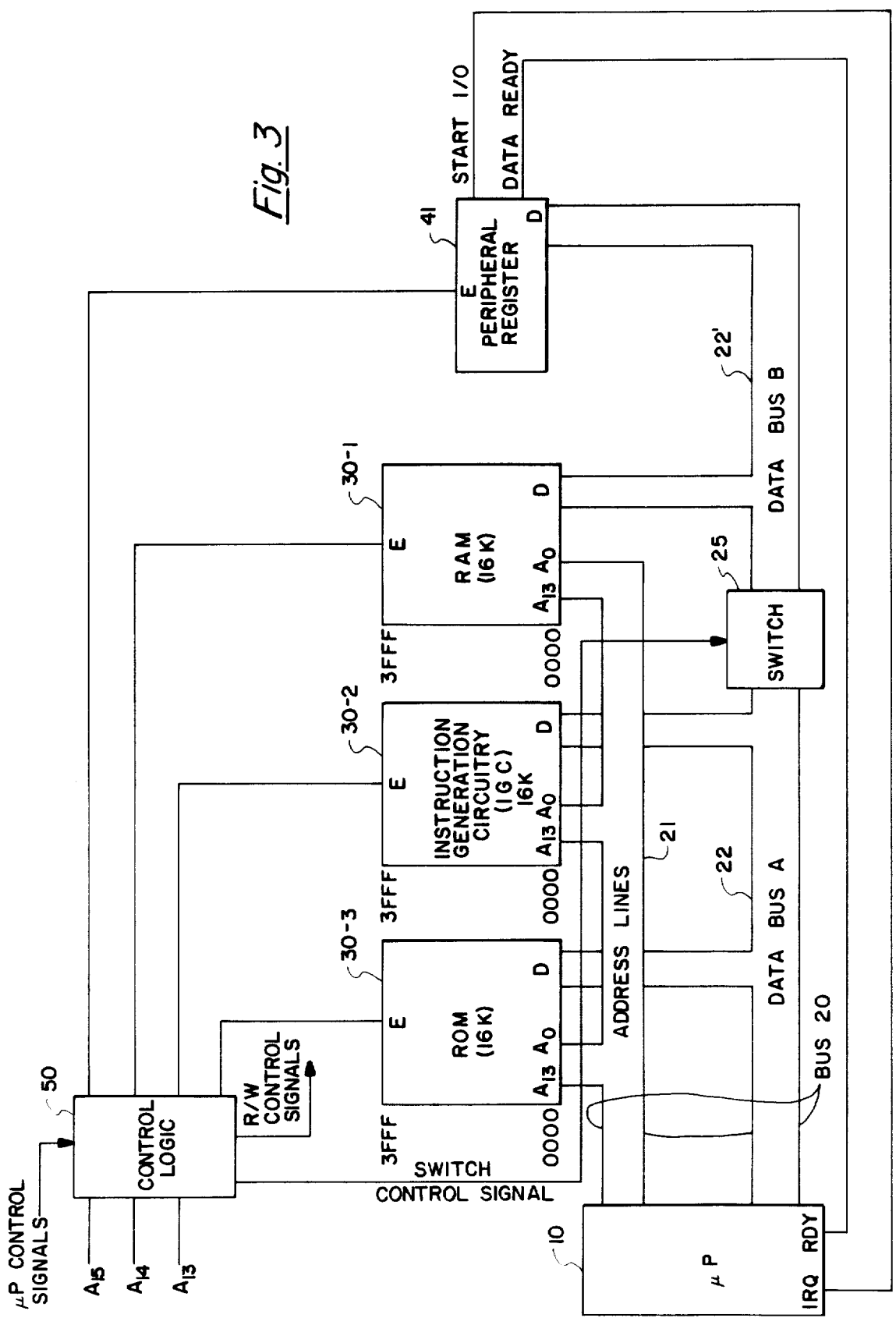

INT ROUTINE (IN ROM)
INT 1  SAVE MACHINE STATE  } OVERHEAD 1
       JUMP TO SUBROUTINE (RAM_TO_PERIPHERAL)
              (FOR READING RAM)
       RESTORE MACHINE STATE } OVERHEAD 2
       EXIT
INT 2  SAVE MACHINE STATE } OVERHEAD 1
       JUMP TO SUBROUTINE (PERIPHERAL_TO_RAM)
              (FOR WRITING INTO RAM)
       RESTORE MACHINE STATE } OVERHEAD 2
       EXIT
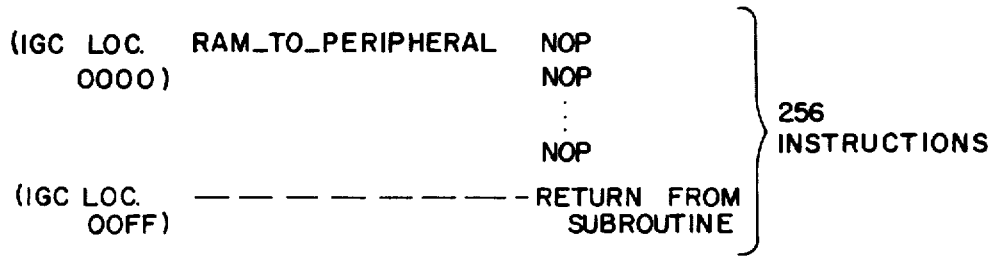
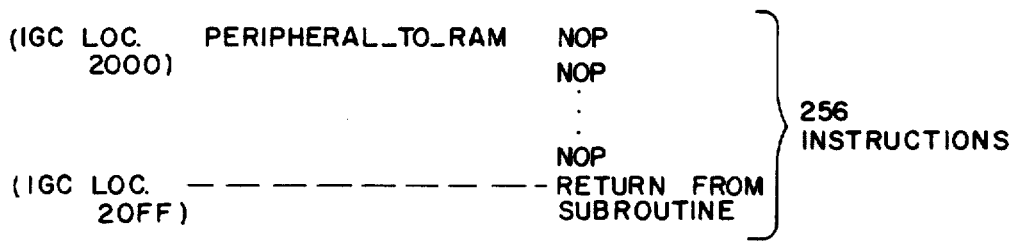
Fig. 6

MICROPROCESSOR ASSISTED DATA BLOCK TRANSFER APPARATUS

This is a continuation of co-pending application Ser. No. 750,433, filed on July 1, 1985, now abandoned.

RELATED PATENT APPLICATION

The present application is related to U.S. patent application, Ser. No. 06/750,797 filed July 1, 1985, now U.S. Pat. No. 4,764,890, entitled "Microprocessor Assisted Memory to Memory Move Apparatus", by S. Rose and R. Freimark, filed on even date herewith, and assigned to Honeywell Inc., the assignee of the present application.

BACKGROUND OF THE INVENTION

This invention relates to information movement within a data processing system generally between a memory unit of the data processing system and a peripheral, and more specifically, relates to a microprocessor based input/output (I/O) controller.

Microprocessor based systems, especially those used as intelligent peripheral controllers, are often faced with a time critical data movement problem. In its simplest form, this problem is one of moving data from a buffer in a peripheral controller device to an ordered array of sequential locations in memory (RAM).

In present systems, data movement is handled by a method normally referred to as programmed I/O, wherein the microprocessor determines the peripheral has a word of data to be transferred via an interrupt or a read of some status. The microprocessor reads the data and stores it in a memory location of RAM. This method is relatively slow and an over-run may occur if the peripheral receives data faster than the microprocessor can remove it. The reverse process, memory to peripheral transfers, is handled similarly. An under-run condition occurs when the microprocessor cannot transfer data to the peripheral fast enough.

A second method of data transfer between memory and a peripheral involves direct memory access (DMA) techniques. In this method the microprocessor instructs a DMA controller to transfer a given block of data to or from a peripheral and the DMA controller transfers the data without further microprocessor intervention. The microprocessor can continue in its normal program execution. High data transfer rates can be attained with DMA techniques.

The present invention allows data transfer rates faster than that attainable with programmed I/O without the expense of a DMA controller. Blocks of data are transferred between the peripheral (an interface to a local area network (LAN) in the preferred embodiment) and memory. The microprocessor is fully involved with the block transfer while it is in progress, i.e., the microprocessor is being single-stepped (made to execute a single instruction on demand) and its address lines are used to point to the memory locations to be affected.

SUMMARY OF THE INVENTION

Therefore, there is supplied by the present invention, in a data processing system, an apparatus for controlling movement of a data block between a peripheral and the data processing system. The apparatus comprises a bus wherein the bus includes, an address bus, a first data bus, and a second data bus, wherein the peripheral is operatively connected to the second data bus. A first memory, operatively connected to the address bus and to the second data bus, stores data. A second memory, operatively connected to the address bus and to the first data bus, stores a plurality of sequences of dummy instructions in predetermined areas of addressable storage locations of the second memory. The predetermined areas of the second memory have corresponding buffer, or addressable storage areas in the first memory, each sequence of dummy instructions being determinative of the direction of the movement of the data between the peripheral and the data processing system. The first memory and the second memory correspond to a first memory area and a second memory area within a total predefined memory space, each memory location within the total memory space being defined by a unique memory space address. A processor element, operatively connected to the address bus and to the first data bus, and further operatively connected to the peripheral, fetches an instruction in response to a control signal from the peripheral, from a preselected one of said sequence of dummy instructions whereby the address of the instruction is placed on the address bus this address thereby specifying a corresponding location of the corresponding buffer, or storage, area in the first memory. A switch, operatively connected to the first data bus and the second data bus, disconnects the first data bus from the second data bus in response to an enable signal, thereby inhibiting the movement of data between the first data bus and the second data bus. A logic element, operatively connected to the first memory, the second memory, the processor element, the switch, and the peripheral, generates at least one control signal to enable at least one of the first memory, the second memory, the switch, and the peripheral in response to the memory area addressed by the processor element such that the fetching of the instruction by the processor element from one of the sequence of dummy instructions causes data to be transferred between the peripheral and the data processing system.

Therefore, it is an object of the present invention to provide an apparatus to perform a data block move operation.

It is another object of the present invention to provide an apparatus to perform a data block move operation with significantly reduced steps of a microprocessor.

It is still another object of the present invention to provide an apparatus to perform a data block move operation with significantly reduced steps thereby reducing the time required to perform the data move operation.

It is still a further object of the present invention to provide an apparatus to perform a high speed data move operation.

It is still another object of the present invention to provide an apparatus to perform a data block move operation with microprocessor assistance wherein the microprocessor performs significantly reduced steps.

These and other objects of the present invention will become more apparent when taken in conjunction with the following description and attached drawings, wherein like characters indicate like parts and which drawings form a part of the present application.

BRIEF DESCRIPTION OF THE DRAWINGS

FIG. 3 shows a block diagram of physical memory within the data processing system of the preferred embodiment of the present invention;

FIG. 6 shows the steps in interrupt routines performed by a microprocessor of the data processing system of the preferred embodiment of the present invention in performing the data block move operation.

DETAILED DESCRIPTION

Figure 1:
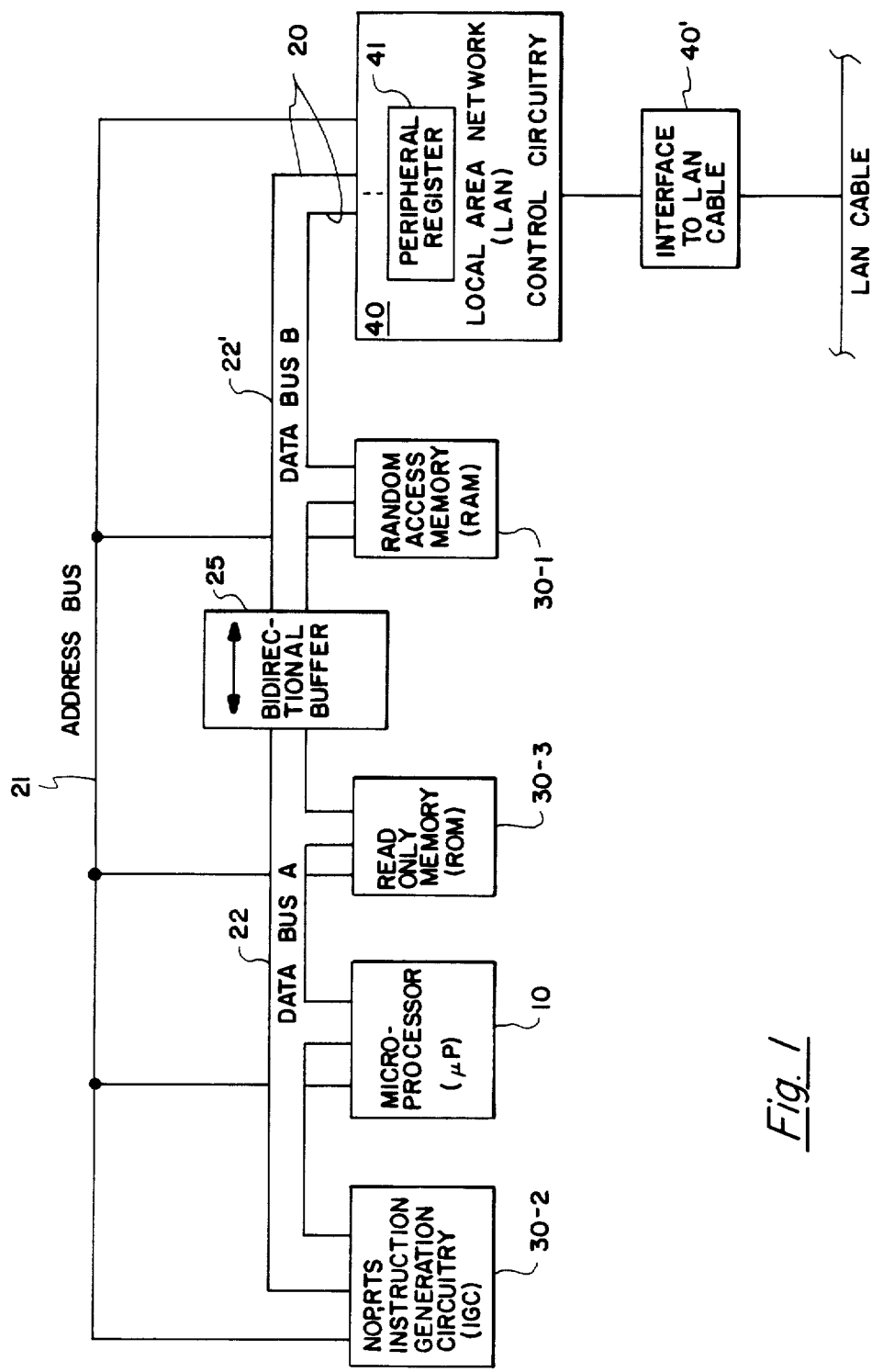
FIG. 1 shows a block diagram of a data processing system in which the present invention can be employed.

Referring to FIG. 1, there is shown a block diagram of a data processing system in which the present invention can be employed. A microprocessor (up) 10 is operatively connected to a data bus A 22. A memory 30, comprised of a random access memory (RAM) 30-1, a NOP, RTS instruction generation circuitry (IGC) 30-2, and a read only memory (ROM) 30-3, and a peripheral controller 40 are also operatively connected to a bus 20. The bus 20 includes an address bus 21 and a data bus 22. IGC memory 30-2, and read only memory 30-3 are operatively connected to data bus A 22. The random access memory 30-1 and the peripheral controller 40 are operatively connected to data bus B 22'. The peripheral controller 40 is shown as the local area network (LAN) control circuitry which is used to interface the data processing system to a local area network cable via the interface to the LAN cable 40'. Although the preferred embodiment of the present invention of FIG. 1 specifically shows a local area network control circuitry 40, it will be understood by those skilled in the art that the present invention is applicable to a wide variety of peripheral controllers and peripheral devices. The utilization of the term peripheral controller is intended to include a wide variety of peripheral controllers which can include some type of input/output register or interface register, denoted herein as peripheral register 41, to interface with a data bus. In the preferred embodiment of the present invention the NOP, RTS instruction generation circuitry 30-2 is implemented with programmable array logic. It will be understood by those skilled in the art that the IGC 30-2 can be implemented with a programmable logic array, or ROM. The NO-operation (NOP) instruction can be any instruction of the microprocessor which has no significant result when executed and may or may not be the NOP instruction of the instruction set of the microprocessor, e.g., the "Load a Immediate" (LDAI) instruction was utilized in the preferred embodiment. The microprocessor 10 of the preferred embodiment of the present invention utilizes a 6502 microprocessor. The data bus 22 is divided into data bus A 22 and data bus B 22' by a bidirectional buffer 25.

Figure 2:
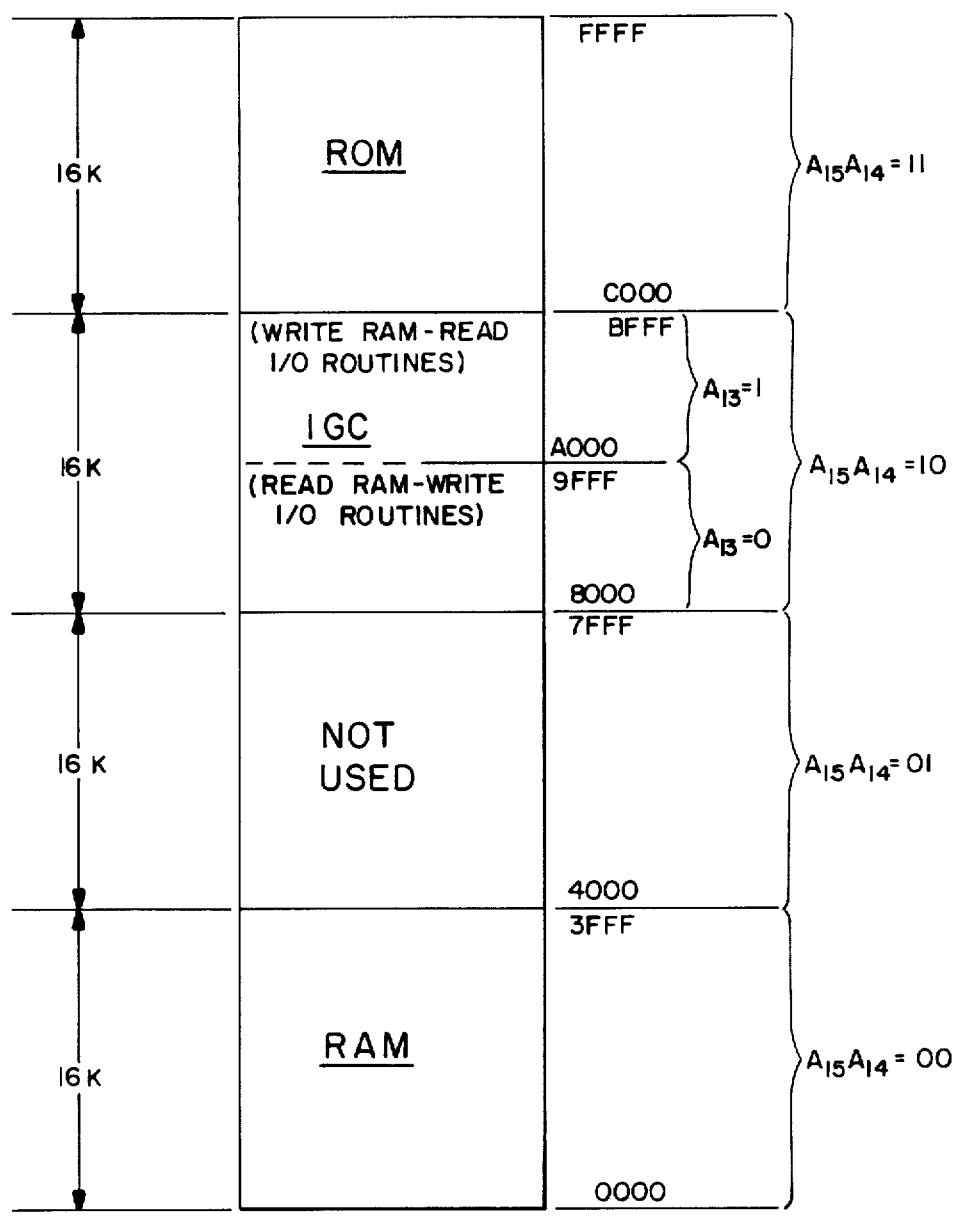
FIG. 2 shows a defined memory map of the preferred embodiment of the present invention.

Referring to FIG. 2, there is shown a memory map of the preferred embodiment of the present invention. The memory 30 (also referred to herein as memory modules) of the data processing system of the preferred embodiment of the present invention is mapped to four 16K segments, the four segments forming a total memory space. Sixteen address lines $A_{15}$–$A_0$, where $A_0$ is the least significant bit, are utilized in bus 20. The upper 16K (locations C000–FFFF hexadecimal, all memory locations given herein are in hexadecimal) is mapped to include a 16K ROM from locations C000–FFFF. For this defined upper 16K of memory, address bits $A_{15}$ and $A_{14}$ are both a logic one. This upper 16K of memory is also referred to herein as the first 16K of memory.

The next, or second, 16K of the defined memory map from location 8000 to BFFF includes the IGC memory space, which is divided into two 8K memory areas. The memory space from 8000–9FFF defines the Read RAM routines in which $A_{13}$ is a logic zero, and the memory space from A000–BFFF defines the WRITE RAM routines in which $A_{13}$ is a logic one. In the second 16K of the defined memory map, $A_{15}$ is a logic one and $A_{14}$ is a logic zero. The third 16K of the defined memory map from locations 4000 to 7FFF is not used in the preferred embodiment of the present invention. In the third 16K of defined memory, $A_{15}$ is a logic zero and $A_{14}$ is a logic one. The fourth (or lower) 16K of the defined memory map from locations 0000 to 3FFF defines the RAM memory space of the preferred embodiment of the present invention. The I/O routines within the second 16K of memory are addressed when a data movement is to be between the peripheral register 41 and RAM memory 30-1, the upper or lower 8K of memory within the IGC memory 30-2 defining the direction of the data movement. This operation will be described in further detail hereinunder. The addresses 0000–FFFF are the memory space addresses within the total memory space; however each memory module 30 has 16K of addressable memory location, the upper two bits, i.e. $A_{15}$ and $A_{14}$, being utilized as control bits to enable the memory module involved in the selected memory operation.

Referring to FIG. 3, there is shown a block diagram of physical memory 30 of the preferred embodiment of the present invention. Memory 30 of the preferred embodiment of the present invention includes a 16K ROM memory module 30-3 having real addresses 0000–3FFF, a 16K IGC memory module 30-2 having real addresses 0000–3FFF, and a 16K RAM memory module 30-1 having real addresses 0000–3FFF. Address bus 21 which includes lines, $A_{13}$–$A_0$ of bus 20, are operatively connected to the corresponding 14 terminals of the ROM 30-3, RAM 30-1 and IGC 30-2. These 14 address lines which carry the corresponding address signals from microprocessor 10 are sufficient to address any location within a 16K area. $A_{15}$, and $A_{14}$ are the upper bits utilized to select one of the 16K areas. In order to avoid memory accesses to a location within the multiple 16K areas, an enable signal is coupled from control logic 50. The control logic 50 generates the proper enable signal by decoding address information contained on address lines $A_{15}$–$A_{13}$, the control logic 50 to be described in detail hereinunder. An enable signal from control logic 50 is also coupled to an enable terminal, E, of peripheral register 41 and a SWITCH CONTROL SIGNAL is also coupled to the bidirectional buffer 25, also denoted herein as a switch. Data lines of data bus A 22 of bus 20 are connected to the corresponding data terminals, D, of the ROM and IGC memory modules. Data lines of data bus B 22' of bus 20 are connected to the data terminals of the peripheral register 41 and the data terminals of the RAM memory module. It will be understood by those skilled in the art that if more than a single peripheral register 41 is utilized in the peripheral controller 40, address lines 21 can be coupled to corresponding address terminals of the peripheral registers (not shown) in order to address a single peripheral register. The peripheral register 41 also has control lines START I/O and DATA READY operatively connected to the interrupt request (IRQ) and ready (RDY) terminals of the microprocessor 10. The interrupt request interrupts the microprocessor and causes an interrupt routine to be performed which initiates and controls the input/output operation. The data ready signal is coupled to the microprocessor 10 each time the peripheral register 41 is full and ready to transfer data. The signal at the RDY terminal of the microprocessor causes the microprocessor to execute a single instruction and then pause (i.e., operates in a "step" mode). For the transfer of data to the peripheral, the initiation of the input/output (I/O) operations is made by the microprocessor 10 which causes an appropriate interrupt routine to be executed and which also utilizes the data ready signal.

Figures 4A, 4B:
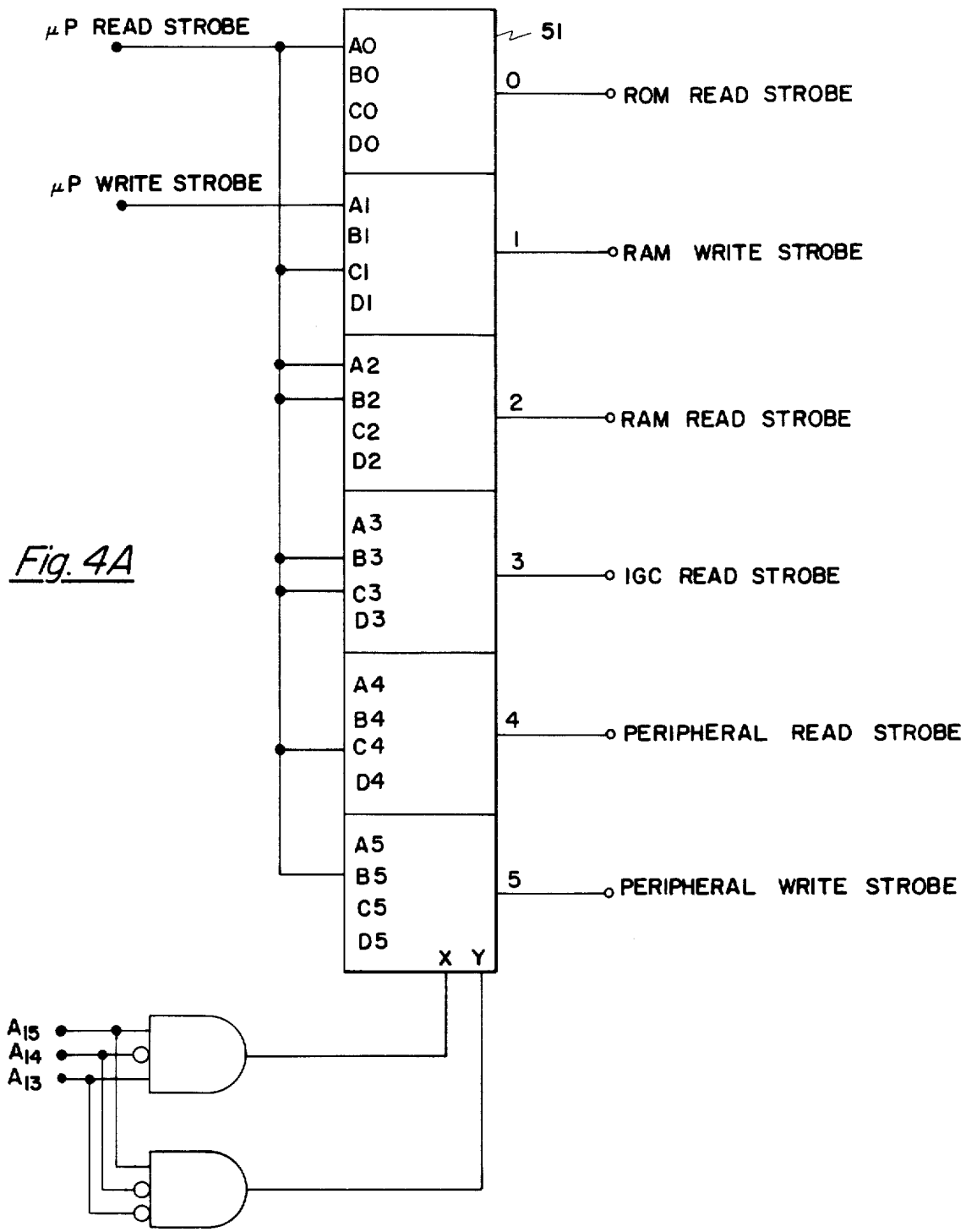
FIG. 4, which is comprised of FIGS. 4A and 4B, shows input and output connections to a multiplexer for switching control signals thereby coupling the appropriate control signals to the appropriate circuitry for accomplishing the desired operation.

Referring to FIGS. 4A and 4B, which together make up FIG. 4, there is shown a block diagram of a multiplexer, MUX, 51 which switches the control signals of the control logic 50 to the appropriate memory module 30 and/or peripheral register 41, thereby achieving the desired read/write operation. The microprocessor read strobe signal is connected to input terminal A0, C1, A2, B2, B3, C3, C4, and B5. The microprocessor write strobe signal is connected to input terminal A1. The output of MUX 51, outputs 0-5, are connected to the ROM read strobe terminal of the memory modules 30 i.e., ROM 30-3, RAM write strobe terminal of RAM 30-1, RAM read strobe terminal of RAM 30-1, read strobe terminal of IGC 30-2, peripheral read strobe terminal, and peripheral write strobe terminal, respectively. Address signals $A_{15}$, $A_{14}$, and $A_{13}$ are utilized to select between input terminals A, B, and C, in accordance with the table of FIG. 4B. In a normal operation by the microprocessor 10 in which the microprocessor is accessing the memory modules 30, the microprocessor is addressing the ROM memory space when $A_{15}$ and $A_{14}$ are both a logic one or is addressing the RAM memory space in which $A_{15}$ and $A_{14}$ are a logic 0. $A_{13}$ is a "don't care" term and is denoted as "X". Hence, the A input terminals of MUX 51 are selected. In this case the microprocessor read strobe signal is coupled to the ROM read strobe terminal and is also coupled to the RAM read strobe terminal via output terminal 2. Hence, normal reads are made from the ROM 30-3, or RAM 30-1, by the microprocessor 10 depending on which module is enabled. When write operations are performed, the microprocessor 10 again addresses address space in which $A_{15}$ and $A_{14}$ are both a logic zero and the write strobe signal is coupled to the RAM write strobe terminal thereby performing normal write operations to the RAM 30-1.

In an I/O operation between RAM and the peripheral, the microprocessor 10 also acts as a controller. When the peripheral register 41 has data to be transferred, assuming a read operation of the peripheral, a start I/O signal is generated by the peripheral controller 40, thereby interrupting the microprocessor 10. The microprocessor 10 then causes the data stored in peripheral register 41 to be directly inputted into RAM memory, thereby bypassing the operation of reading the data into an internal register of the microprocessor 10 and then outputting the data into memory 30. The microprocessor performs "dummy operations" (i.e., the execution of NOP type instructions as discussed above) whereby RAM addresses are placed on the address lines 21 in which the data is to be stored. The address space accessed by the microprocessor 10 is the upper 8K of the second 16K of the defined memory map in which $A_{15}$, $A_{14}$, and $A_{13}$ are a logic one, a logic zero, and a logic one, respectively. This causes the C input terminals of MUX51 to be selected. The "dummy operation" from the microprocessor causes the read strobe signal to be coupled via input C1 to the RAM write strobe terminal. The microprocessor "dummy operation" also causes the read strobe signal to be coupled via input C4 to the peripheral read strobe terminal. Hence, the peripheral operation is a read, or output of the data, the data being placed on the data lines of data bus B 22' and the RAM accepts the data that is present on the data lines of data bus B 22', and is written into the RAM at the address specified on the address lines 21, the address being the address of the "dummy operation". The "NOP" instruction causes the microprocessor 10 to execute "no operation", although a fetch is made by the microprocessor for this instruction. It is the fetch of an instruction from the IGC address space that causes the data movement. Hence, data is transferred directly from the peripheral register 41 into the RAM and bypasses the transfer of the data into the microprocessor 10. Since the microprocessor 10 is performing a dummy operation, i.e. a fetch of a NOP instruction from IGC 30-2, the data bus A, or segment A is separated from data bus B, or segment B via switch 25. The address of the fetch is also the address of RAM being written into. When a write operation from memory to the peripheral register 41 is to be performed, the microprocessor performs a "dummy operation" causing the address of RAM memory to be read to be placed on address lines 21, the fetches of the NOP instructions to be in the lower 8K of the 16K IGC memory area, in which $A_{15}$ is a logic zero $A_{14}$ is a logic one, and $A_{13}$ is a logic zero, this area having been defined as the NOP area for data move from memory to the peripheral. In the lower 8K of the 16K IGC memory area, input terminals B are selected. In this case the microprocessor "dummy operation" causes the microprocessor read strobe signal to be coupled to the RAM read terminal via B2 and also causes the microprocessor read strobe signal to be coupled to the peripheral write terminal via B5. Hence, the data is placed on the data bus B 22' from the RAM 30-1, and the data present on the data bus B 22' is written into the peripheral register 41. Again, the enable signals coupled to the memory modules 30 cause data from the RAM 30-1, to place data on the data bus B 22'. This operation again bypasses the microprocessor having to read the data into an internal register and then outputting the data to the peripheral controller 41.

Figure 5:
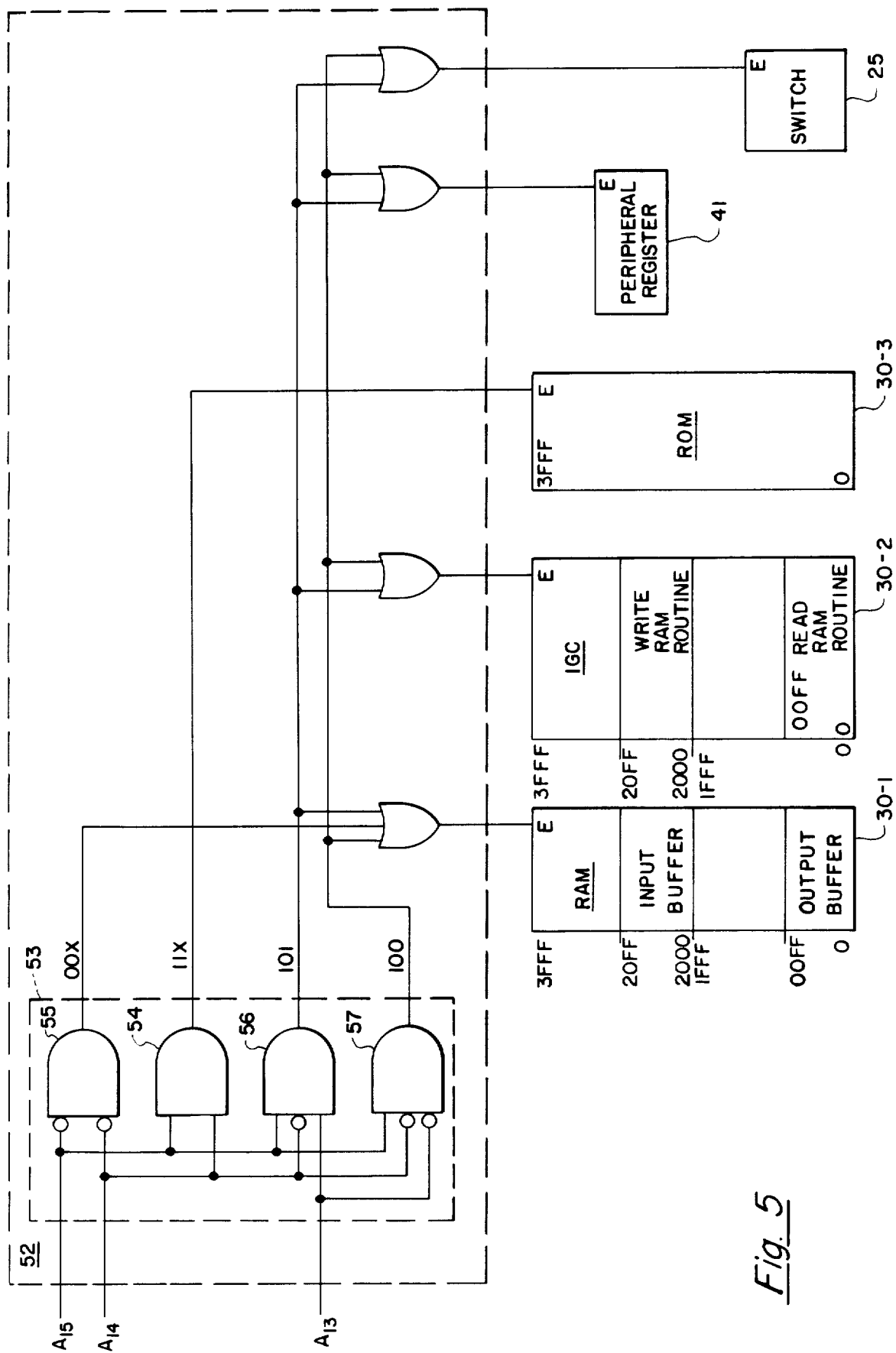
FIG. 5 shows a logic block diagram of enable logic.

Referring to FIG. 5, there is shown a block diagram of enable logic 52 of the control logic 50. The enable logic 52 generates an enable signal for each of the memory modules 30-1, 30-2, 30-3, and for the peripheral register 41 and the switch 25, the corresponding enable signal being coupled to the corresponding enable terminal, E, of each module. When the microprocessor 10 is accessing the ROM or RAM memory modules 30, the first 16K address space is utilized and $A_{15}$ and $A_{14}$ are both a logic one, or the last 16K address space is utilized and $A_{15}$ and $A_{14}$ are both a logic zero, respectively. A decoder 53 decodes the signals associated with address lines $A_{15}$, $A_{14}$, and $A_{13}$. Hence, when the microprocessor 10 is accessing ROM, the first 16K address space is being utilized, $A_{15}$ and $A_{14}$ are both a logic one, and AND gate 54 is enabled thereby providing an enable signal to ROM 30-3. When the microprocessor is accessing RAM, the last 16K address space is being utilized, $A_{15}$ and $A_{14}$ are both a logic zero, and AND gate 55 is enabled thereby providing an enable signal to RAM 30-1. When an I/O operation is being performed between RAM and the peripheral, the second 16K address space is being utilized in which $A_{15}$ and $A_{14}$ are a logic one and a logic zero respectively. If data is to be inputted to the RAM from the peripheral register, memory accesses are made by the microprocessor to the upper 8K of the IGC memory area, i.e., the upper 8K of the second 16K address area, in which $A_{13}$ is a logic one. Hence, AND gate 56 is enabled providing an enable signal to RAM, providing an enable signal to the peripheral register 41, and providing an enable signal to the IGC memory module 30-2. In addition, an enable signal is provided to switch 25, such that when the enable signal is high the operation of the switch is such that data bus A 22 is disconnected from data bus B 22', i.e., the switch is opened. When the I/O operation between the RAM and the peripheral is such that data from the RAM is being written into the peripheral register, i.e., data is being outputted from RAM 30-1, the addresses fetched from IGC memory are from the lower 8K of the second 16K memory area, i.e., the second 16K address area, and $A_{13}$ is a logic zero. In this case, AND gate 57 is enabled thereby providing an enable signal to the RAM 30-1 and to the peripheral register 41. In addition the enable signal is also provided to the switch 25 and to the IGC memory module 30-2. The read and write control signals are provided to the respective modules as described above in conjunction with the multiplexer 51. In the preferred embodiment of the present invention a data block of 256 data words is transferred between the RAM 30-1 and the peripheral register 41. A fetch of the NOP instruction is made in response to a DATA READY signal which allows the microprocessor 10 to execute one instruction. Hence, 256 instruction fetches are made in the respective read-or-write RAM routines which are sequences of dummy instructions, also denoted herein as dummy routines. The area of memory of IGC memory 30-2 which contains the 256 instructions (i.e., 255 NOP and one Return) are mirrored for buffer areas in the corresponding RAM buffer areas. Hence, the location which contains the write RAM routine has a corresponding input buffer in RAM 30-1, and the read RAM routine in IGC memory 30-2 has a corresponding output buffer in RAM memory module 30-1.

Referring to FIG. 6, there is shown the operations performed by the interrupt routines of the microprocessor 10. When an I/O operation is to be initiated, the I/O start signal is transferred which invokes an interrupt routine INT1 within the microprocessor (or INT2 is initiated internally by the microprocessor 10), depending on whether the I/O transfer is to be from RAM to peripheral or from peripheral to RAM, respectively. Both interrupt routines, INT1 or INT2 save the machine state, jump to a subroutine, and subsequently restore the machine state and then exit. The difference between the two interrupt routines is the jump to a subroutine. INT1 jumps to a subroutine which is in an IGC memory 30-2 area which generates the control signals and the enable signals for the RAM to peripheral transfer. The subroutine which is jumped to by the INT2 interrupt routine is in an area of IGC memory 30-2 which generates the control signals for performing the peripheral to RAM transfer, the generation of the control signals having been described above. The subroutine for the RAM to peripheral transfer contains 255 NOP instructions plus a return from subroutine instruction making a total of 256 instructions (for a 256 word block transfer). These instructions lie in an area of IGC memory from location 0000 to location 00FF. These locations are the areas addressed by the microprocessor in performing the fetch for the NOP instruction. While the fetch is being performed the address is placed on the address lines which are also coupled to the RAM. Thus, location 0000 through location 00FF has a corresponding output buffer within RAM. A similar routine exists for the input of data into RAM, the 255 NOP instructions for the INT2 jump routine within the INT2 interrupt routine is located in IGC locations 2000 through location 20FF. Thus, there exists a corresponding input buffer within RAM from locations 2000 through 20FF. The 256 location assumes data block transfers being fixed at 256 words. If any error occurs in the transfer various techniques may be incorporated to get around the error. A timer is set such that if an I/O transfer hangs up, and the timer times out, the timer causes the interrupt routine to be exited to an error routine which can then reset the I/O and form a retry, or any other error processing may be performed. The subroutines are placed in locations within the second 16K address space to correspond to predetermined buffer areas.

Although direct transfers from the microprocessor to the peripheral register have not been addressed thus far, provisions for such a transfer can be made by allocating an area within the third 16K address space which is not currently used, in which $A_{15}$ and $A_{14}$ are a logic zero and a logic one, respectively. When a transfer from the peripheral to the microprocessor, or from the microprocessor to the peripheral is desired the microprocessor addresses the third 16K address space, the enable logic of FIG. 5 would be modified to decode $A_{15}$, $A_{14}$ for the logic zero, logic one state and the enable signals generated thereby being coupled to the appropriate memory modules. Further, the multiplexer 51 of FIG. 4 would be modified so that input terminals D are utilized and the select inputs X, Y would have coupled thereto the decoding of the A15 and A14 when these signals are a logic zero and a logic one, respectively. For a more detailed description of how such a transfer would be implemented reference can be had to the related patent application entitled "Microprocessor Assisted Memory to Memory Move Apparatus", Ser. No. 06/750,797 filed July 1, 1985, now U.S. Pat. No. 4,764,896, assigned to the same assignee as the present application filed on even date herewith, said related application being incorporated by reference herein. Further, it will be understood by those skilled in the art that the IGC memory 30-2 can be included in the ROM area of memory thereby requiring some modification of the control logic 50. For a more detailed description of how to implement this structure reference can be had to the related patent, which is incorporated by reference herein.

Although there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

We claim:

1. In a data processing system, an apparatus for controlling the movement of a data block between a peripheral and the data processing system, said apparatus, comprising:
   (a) a bus wherein said bus includes:
      (i) an address bus;
      (ii) a first data bus; and
      (iii) a second data bus, wherein said peripheral is operatively connected to said second data bus;
   (b) first memory means, having a plurality of locations and a corresponding address for each location whereby each location is separately addressable, and operatively connected to said address bus and to said second data bus, for storing data;
   (c) second memory means, having a plurality of locations and a corresponding address for each location whereby each location is separately addressable, and operatively connected to said address bus and to said first data bus, for storing a sequence of dummy instructions in predetermined areas of said second memory means having corresponding buffer areas in said first memory means, and further wherein each addressable location within the predetermined area of said second memory means has a corresponding addressable location within the corresponding buffer area of said first memory means;
   (d) processor means, operatively connected to said address bus and to said first data bus, and further operatively connected to said peripheral, for fetching a preselected one of said dummy instructions from said second memory means in response to a control signal from said peripheral, such that address signals corresponding to the address of said dummy instruction are coupled to the address bus thereby indicating the corresponding location of the buffer area in said first memory means;
   (e) switch means, interposed between said first data bus and said second data bus to provide a connection therebetween, for disconnecting the first data bus from the second data bus in response to an enable signal, thereby inhibiting the transfer of data between said first data bus and the second data bus, thereby permitting said processor means to operate as a controller in the transfer of data between the peripheral and the first memory means of the data processing system; and
   (f) logic means, operatively connected to said address bus, said first memory means, said second memory means, said processor means, said switch means, and said peripheral, for generating at least one control signal to enable at least one of said first memory means, said second memory means, said switch means, and said peripheral in response to the memory area addressed by said processor means, such that the fetching of said dummy instruction by said processor means via said first data bus does not interfere with the essentially simultaneous transfer of data between the peripheral and the first memory means via said second data bus, the address of the dummy instruction being fetched also defining the location of the first memory means nvolved in the data transfer and the direction of the data transfer between said peripheral and said first memory means.

2. In a data processing system, an apparatus for controlling the movement of a data block between a peripheral and the data processing system, said apparatus, comprising:
   (a) a bus wherein said bus includes:
      (i) an address bus;
      (ii) a first data bus; and
      (iii) a second data bus, wherein said peripheral is operatively connected to said second data bus;
   (b) read-only memory means, operatively connected to said first data bus and to said address bus, for storing instructions;
   (c) first memory means, having a plurality of locations and a corresponding address for each location whereby each location is separately addressable, and operatively connected to said address bus and to said second data bus, for storing data;
   (d) second memory means, having a plurality of locations and a corresponding address for each location whereby each location is separately addressable, and operatively connected to said address bus and to said first data bus, for storing a sequence of dummy instructions in predetermined areas of said second memory means having corresponding buffer areas in said first memory means, and further wherein each addressable location within the predetermined area of said second memory means has a corresponding addressable location within the corresponding buffer area of said first memory means;
   (e) processor means, operatively connected to said address bus and to said first data bus, and further operatively connected to said peripheral, for fetching a preselected one of said dummy instructions from said second memory means in response to a control signal from said peripheral, such that address signals corresponding to the address of said dummy instruction are coupled to the address bus thereby indicating the corresponding location of the buffer area in said first memory means;
   (f) switch means, interposed between said first data bus and said second data bus to provide a connection therebetween, for disconnecting the first data bus from the second data bus in response to an enable signal, thereby inhibiting the transfer of data between said first data bus and the second data bus, thereby permitting said processor means to operate as a controller in the transfer of data between the peripheral and the first memory means of the data processing system; and
   (g) logic means, operatively connected to said address bus, said read-only memory means, said first memory means, said second memory means, said processor means, said switch means, and said peripheral, for generating at least one control signal to enable at least one of said first memory means, said read-only memory means, said second memory means, said switch means, and said peripheral in response to the memory area addressed by said processor means, such that the fetching of said dummy instruction by said processor means via said first data bus does not interfere with the essentially simultaneous transfer of data between the peripheral and the first memory means via said second data bus, the address of the dummy instruction being fetched also defining the location of the first memory means involved in the data transfer and the direction of the data transfer between said peripheral and said first memory means.

3. In a data processing system an apparatus for controlling the movement of a data block between a peripheral and the data processing system, said apparatus, comprising:
(a) a bus wherein said bus includes:
  (i) an address bus;
  (ii) a first data bus; and
  (iii) a second data bus, wherein said peripheral is operatively connected to said second data bus;
(b) first memory means, having a plurality of locations and a corresponding address for each location whereby each location is separately addressable, and operatively connected to said address bus and to said second data bus, for storing data;
(c) second memory means, having a plurality of locations and a corresponding address for each location whereby each location is separately addressable, and operatively connected to said address bus and to said first data bus, for storing a sequence of dummy instructions in predetermined areas of said second memory means having corresponding buffer areas in said first memory means, and further wherein each addressable location within the predetermined area of said second memory means has a corresponding addressable location within the corresponding buffer area of said first memory means, each predetermined area of the second memory means being determinative of a direction of the data transfer between the peripheral and the first memory means;
(d) processor means, operatively connected to said address bus and to said first data bus, and further operatively connected to said peripheral, for fetching a preselected one of said dummy instructions from said second memory means in response to a control signal from said peripheral, such that address signals corresponding to the address of said dummy instruction are coupled to the address bus thereby indicating the corresponding location of the buffer area in said first memory means;
(e) switch means, interposed between said first data bus and said second data bus to provide a connection therebetween, for disconnecting the first data bus from the second data bus in response to an enable signal, thereby inhibiting the transfer of data between said first data bus and the second data bus, thereby permitting said processor means to operate as a controller in the transfer of data between the peripheral and the first memory means of the data processing system; and
(f) logic means, operatively connected to said address bus, said first memory means, said second memory means, said processor means, said switch means, and said peripheral, for generating at least one control signal to enable at least one of said first memory means, said second memory means, said switch means, and said peripheral in response to the memory area addressed by said processor means, such that the fetching of said dummy instruction by said processor means via said first data bus does not interfere with the essentially simultaneous transfer of data between the peripheral and the first memory means via said second data bus, the address of the dummy instruction being fetched also defining the location of the first memory means involved in the data transfer and the direction of the data transfer between said peripheral and said first memory means.

4. In a data processing system, an apparatus for controlling the movement of a data block between a peripheral and the data processing system, said apparatus, comprising:
(a) a bus wherein said bus includes:
  (i) an address bus;
  (ii) a first data bus; and
  (iii) a second data bus, wherein said peripheral is operatively connected to said second data bus;
(b) read-only memory means, operatively connected to said first data bus and to said address bus, for storing instructions;
(c) first memory means, having a plurality of locations and a corresponding address for each location whereby each location is separately addressable, and operatively connected to said address bus and to said second data bus, for storing data;
(d) second memory means, having a plurality of locations and a corresponding address for each location whereby each location is separately addressable, and operatively connected to said address bus and to said first data bus, for storing a sequence of dummy instructions in predetermined areas of said second memory means having corresponding buffer areas in said first memory means, and further wherein each addressable location within the predetermined area of said second memory means has a corresponding addressable location within the corresponding buffer area of said first memory means, each memory location of said read-only memory means, said first memory means, and said second memory means having a unique memory address within a predefined total memory space, wherein the read-only memory means, the second memory means, and the first memory means corresponds to a first memory segment, a second memory segment, and a third memory segment, respectively, within the total memory space;
(e) processor means, operatively connected to said address bus and to said first data bus, and further operatively connected to said peripheral, for fetching a preselected one of said dummy instructions from said second memory means in response to a control signal from said peripheral, such that address signals corresponding to the address of said dummy instruction are coupled to the address bus thereby indicating the corresponding location of the buffer area in said first memory means;
(f) switch means, interposed between said first data bus and said second data bus to provide a connection therebetween, for disconnecting the first data bus from the second data bus in response to an enable signal, thereby inhibiting the transfer of data between said first data bus and the second data bus, thereby permitting said processor means to operate as a controller in the transfer of data between the peripheral and the first memory means of the data processing system; and
(g) logic means, operatively connected to said address bus, said read-only memory means, said first memory means, said second memory means, said processor means, said switch means, and said peripheral, for generating at least one control signal to enable at least one of said first memory means, said read-only memory means, said second memory means, said switch means, and said peripheral in response to the memory area addressed by said processor means, such that the fetching of said dummy instruction by said processor means via said first data bus does not interfere with the essentially simultaneous transfer of data between the peripheral and the first memory means via said second data bus, the address of the dummy instruction being fetched also defining the location of the first memory means involved in the data transfer and the direction of the data transfer between said peripheral and said first memory means.

5. In a data processing system, an apparatus for controlling the movement of a data block between a peripheral and the data processing system, said apparatus, comprising:

(a) a bus wherein said bus includes:
  (i) an address bus;
  (ii) a first data bus; and
  (iii) a second data bus, wherein said peripheral is operatively connected to said second data bus;
(b) read-only memory means, operatively connected to said first data bus and said address bus, for storing instructions;
(c) first memory means, having a plurality of locations and a corresponding address for each location whereby each location is separately addressable, and operatively connected to said address bus and to said second data bus, for storing data;
(d) second memory means, having a plurality of locations and a corresponding address for each location whereby each location is separately addressable, and operatively connected to said address bus and to said first data bus, for storing a sequence of dummy instructions in predetermined areas of said second memory means having corresponding buffer areas in said first memory means, and further wherein each addressable location within the predetermined area of said second memory means has a corresponding addressable location within the corresponding buffer area of said first memory means, each memory location of said read-only memory means, said first memory means, and said second memory means having a unique memory address within a predefined total memory space, wherein the read-only memory means, the second memory means, and the first memory means corresponds to a first memory segment, a second memory segment, and a third memory segment, respectively, within the total memory space;
(e) processor means, operatively connected to said address bus and to said first data bus, and further operatively connected to said peripheral, for fetching a preselected one of said dummy instructions from said second memory means in response to a control signal from said peripheral, such that address signals corresponding to the address of said dummy instruction are coupled to the address bus thereby indicating the corresponding location of the buffer area in said first memory means;
(f) switch means, interposed between said first data bus and said second data bus to provide a connection therebetween, for disconnecting the first data bus from the second data bus in response to an enable signal, thereby inhibiting the transfer of data between said first data bus and the second data bus, thereby permitting said processor means to operate as a controller in the transfer of data between the peripheral and the first memory means of the data processing system; and
(g) logic means, operatively connected to said address bus, said read-only means, said first memory means, said second memory means, said processor means, said switch means, and said peripheral, for generating at least one control signal to enable at least one of said first memory means, said read-only memory means, said second memory means, said switch means, and said peripheral in response to the memory location within the total memory space addressed by said processor means, such that:
  (i) the fetching of a word from said first memory segment by said processor means causes an instruction to be read into said processor means from said read-only memory means;
  (ii) the fetching of a word from said third memory segment by said processor means causes a word to be transferred between said first memory means and said processor means; and
  (iii) the fetching of a word from said second memory segment by said processor means causes a word to be read into said processor means from said second memory means via said first data bus, and further causes data to be transferred essentially simultaneously between said peripheral and said first memory means via said second data bus, said switch means being enabled in response to a control signal from said logic means to effectively disconnect the first data bus from the second data bus.

* * * * *